United States Patent
Tizac

(10) Patent No.: US 8,794,092 B2
(45) Date of Patent: Aug. 5, 2014

(54) DISENGAGEABLE INTERFACE MECHANISM BETWEEN A MOTORIZATION SYSTEM OF AN AIRCRAFT LANDING GEAR ASSEMBLY AND A WHEEL

(75) Inventor: Laurent Tizac, Tournefeuille (FR)

(73) Assignee: Airbus Operations S.A.S., Toulouse (FR)

( * ) Notice: Subject to any disclaimer, the term of this patent is extended or adjusted under 35 U.S.C. 154(b) by 161 days.

(21) Appl. No.: 13/481,235

(22) Filed: May 25, 2012

(65) Prior Publication Data

US 2012/0312112 A1 Dec. 13, 2012

(30) Foreign Application Priority Data

May 27, 2011 (FR) ...................................... 11 54643

(51) Int. Cl.
*F16H 3/34* (2006.01)
*B64C 25/40* (2006.01)
(52) U.S. Cl.
CPC ............. *B64C 25/405* (2013.01); *Y02T 50/823* (2013.01)
USPC ........................ 74/354; 244/103 R; 244/103 S
(58) Field of Classification Search
USPC .................. 74/354, 421 A; 244/103 R, 103 S
See application file for complete search history.

(56) References Cited

U.S. PATENT DOCUMENTS

| 3,397,589 A | 8/1968 | Moore | |
|---|---|---|---|
| 3,542,318 A * | 11/1970 | Ellsworth | 244/103 S |
| 3,850,389 A | 11/1974 | Dixon | |
| 4,659,039 A * | 4/1987 | Valdes | 244/103 S |
| 5,104,063 A * | 4/1992 | Hartley | 244/103 S |
| 5,441,315 A | 8/1995 | Kleefeldt et al. | |
| 7,469,858 B2 * | 12/2008 | Edelson | 244/103 S |

FOREIGN PATENT DOCUMENTS

FR 2 693 757 1/1994

OTHER PUBLICATIONS

Search Report issued Feb. 1, 2012 in French Application No. 1154643 (With English Translation of Category of Cited Documents).

* cited by examiner

*Primary Examiner* — Ha D Ho
(74) *Attorney, Agent, or Firm* — Oblon, Spivak, McClelland, Maier & Neustadt, L.L.P.

(57) ABSTRACT

A motorization mechanism for a wheel of a landing gear assembly, including an input gear driven by a motor-reducer unit; a pendulum element, carrying two intermediate gear wheels driven in rotation by this element, with the intermediate gear wheels having synchronized rotation blocking mechanisms such that the two intermediate gear wheels can be simultaneously engaged or simultaneously released. The angular displacement of the pendulum element around its rotation axis is limited by a first and a second adjustable stop. These adjustable stops are set so that when the pendulum element comes into contact with an adjustable stop, the blocking mechanism of the intermediate gear wheels is freed, whereas it is engaged when the pendulum element is in the neutral position. This pendulum assembly faces a cog wheel that is capable of driving the hub of the said wheel.

6 Claims, 5 Drawing Sheets

DISENGAGEABLE INTERFACE MECHANISM BETWEEN A MOTORIZATION SYSTEM OF AN AIRCRAFT LANDING GEAR ASSEMBLY AND A WHEEL

The object of this invention is a motorized mechanism for an aircraft landing gear wheel comprising a declutchable interface between the motorized mechanism and the wheel.

PREAMBLE AND PRIOR ART

At present, ground movements for aircraft in airport zones classically require the assistance of tractors to move from their parking location to a point where the engines can be used to move the aircraft. This constraint causes delays prior to take-off, while aircraft turnover must be as fast as possible for economical reasons.

Furthermore, when aircraft land, they circulate on the ground by means of their jet engines, which, at the same time, is acoustically disruptive for the vicinity and results in an un efficient fuel consumption, as well as in an early wear of brake parts.

On the contrary, an autonomous aircraft is one that can move around on the ground on its own from the landing strip to the parking location and inversely, from the parking location to the take-off strip. Such an autonomy naturally implies motorization of the landing gear components of the aircraft.

There are several known methods for motorizing the drive train, for example using electric motors installed near the wheels. Such systems generally present unwieldy clutch mechanisms and are poorly integrated with the landing gear apparatus.

DESCRIPTION OF THE INVENTION

The invention concerns a mechanism for motorizing a wheel of an aircraft's landing gear, comprising a motor-reducer unit and an interface device installed between the motor-reducer unit and the wheel.

The interface device comprises:
An input gear fitted so as to be directly driven by the motor-reducer unit and joined to a rotating shaft along a lateral axis Y.
A cog wheel which axis is parallel to lateral axis Y capable of driving the rim of the said wheel rotationally, with the cog wheel and the input gear arranged on a same vertical plane XZ and a vertical axis Z defined by the center line of the input gear and the cog wheel, and a longitudinal axis X laid out perpendicular to the vertical Z axis in the middle plane of the cog wheel and the input gear.
A pendulum element, joined to the rotating shaft of the input gear and set in the neutral position, carrying an intermediate gear arrayed alongside the input gear on the XZ plane, driven in rotation around an axis parallel to the lateral axis Y by the rotation of the cog wheel.

The intermediate gear wheel contains a rotation blocking mechanism.

The angular path of the pendulum element around its rotation axis is limited by an adjustable stop.

This adjustable stop is set so that when the pendulum element comes into contact with the stop, the blocking mechanism of the intermediate gear is released, whereas it is engaged when the pendulum element is in a neutral position.

The distance between the pendulum element's rotation axis and the rotation axis of the cog wheel is determined by the radii of the intermediate gear wheel and of the said cog wheel, and by the fact that the cog wheel and the intermediate gear wheel mesh when the pendulum element is jammed against the adjustable stop.

It should be noted that the pendulum mechanism is preferably maintained in its neutral position so as to remain entirely unaffected by vibrations experienced during the taxiing or during the flight.

In this layout, the mechanism is set up to drive the moving parts of the landing gear in one single direction.

According to a preferred embodiment of the invention, in which the mechanism can move landing gear components in both directions, the mechanism comprises:
A first and second coplanar intermediate gear wheel, arranged onto the pendulum element on either side of the input gear wheel and driven in rotation by the rotating action of this input gear wheel
At least one of the intermediate gear wheels contains a rotation blocking mechanism
The angular displacement of the pendulum element around its rotation axis is limited within a minimum and maximum value by a first and then a second adjustable stop
These adjustable stops are adjusted so that:
1—the mesh lines of a gear with the cog wheel conform to theory,
2—when the pendulum element comes into contact with a stop, the blocking mechanism of the intermediate gear wheels is just released, whereas it is engaged when the pendulum element is in the neutral position, with this pendulum assembly facing a cog wheel that is coaxial to the landing gear wheel, the said cog wheel capable of driving the rim of the said wheel.

The distance between the pendulum element's rotation axis and the rotation axis of the cog wheel is determined by the radius of the intermediate gear wheel and the said cog wheel, and by the fact that the cog wheel and one or the other of the intermediate gear wheels mesh when the suspended element is jammed against one or the other of the adjustable stops.

According to a preferred embodiment, each intermediate gear wheel comprises a blocking device with the blocking mechanisms carried by the pendulum elements and synchronized in such a way that the two intermediate gear wheels are either simultaneously engaged or simultaneously released.

When an intermediate gear wheel begins to mesh in the cog wheel, with the pendulum element not yet jammed by an adjustable stop, the blocking mechanism is preferably partially released and determines rotational play with regard to the intermediate gear wheel. This setup ensures that the gear wheel and the cog wheel find a position in which they are perfectly engaged.

The way the stops are set up ensures a pawl effect with regard to the pendulum element.

A second aspect of the invention is a landing gear, comprising a motorization mechanism to drive the wheel as described above.

In yet another aspect, the invention concerns an aircraft equipped with a motorization mechanism of the wheel as described above.

EXPLANATION OF DRAWINGS

The characteristics and advantages of the invention will be better understood in light of the following description, which exposes the features of the invention through a non-limitative example of its application.

The description is supported by the appended drawings, in which.

DETAILED DESCRIPTION OF ONE EMBODIMENT OF THE INVENTION

The invention is located in the main landing gear of an aircraft of a type comprising two wheels arranged symmetrically in relation to a medium vertical plane.

We note here however, that the invention can be likewise applied to a landing system with a single wheel.

Figure 1:
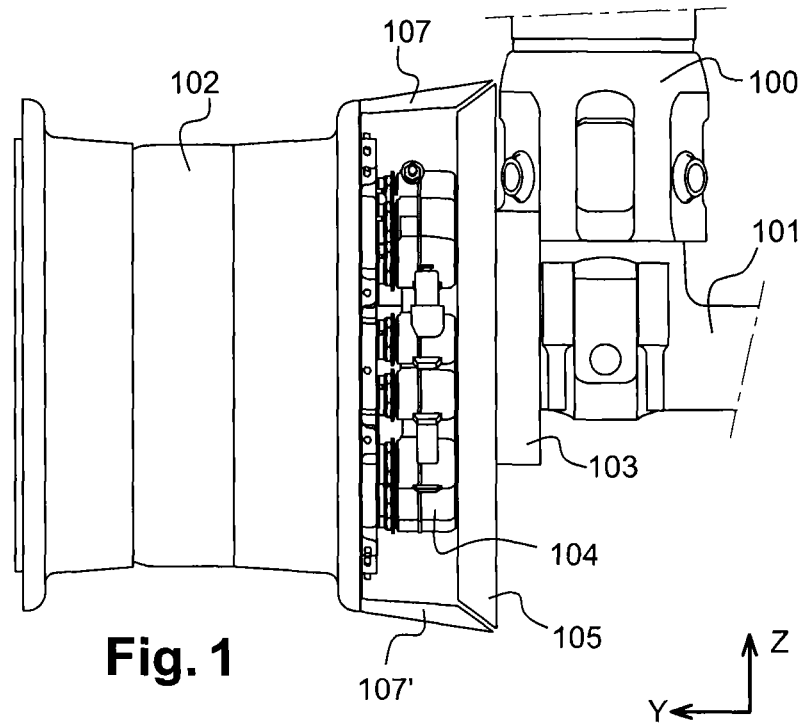
FIG. 1 provides a schematic drawing in front view of the mechanism installed within the landing gear of an aircraft.

FIG. 1 shows a front view of the detail of such a landing gear assembly.

A reference system is established regarding this landing gear assembly for the rest of the description, said system comprising A longitudinal axis X parallel to the direction of movement of the wheels A lateral Y axis parallel to the direction of the axis of the wheels A vertical Z axis perpendicular to the preceding axes The terms "front", "rear", "above", "below", etc. are defined with relation to this reference system.

In FIG. 1 we can recognize, the upright 100 of the landing gear, the shock absorber shaft 101 supporting the wheels through the intermediary of spindles of the said landing gear assembly, which carry two wheel rims 102 (only one of which is shown in FIG. 1), each wheel rim being equipped with a braking mechanism 104. The landing gear assembly also comprises a motor-reducer unit 103, here an electrically powered unit, intended to drive the wheels. The sizing of this motor-reducer unit 103 is determined by referring to the standards and technical requirements particular to the aircraft, understood by persons skilled in the art.

In the embodiment described here on a non-limitative basis, an interface mechanism is installed on every wheel between the power unit 103 and the brake 104. With regard to the standard lay-out of brake assemblies, this one is slightly offset from the value necessary to integrate the said interface device into the interior of the wheel 102.

This interface mechanism includes a rotating part 105 driven by the motor-reducer unit 103. This rotating part 105 is in the form of a disk. The revolving piece 105 of the interface device is connected to the final reduction stage of the transmission gearbox of the motor-reducer unit 103 by means of a drive coupling, for example, an Oldham coupling.

In this way, the interface device is isolated from any static movements of the shaft 101, onto which is fixed the motor-reducer unit 103.

Figure 2:
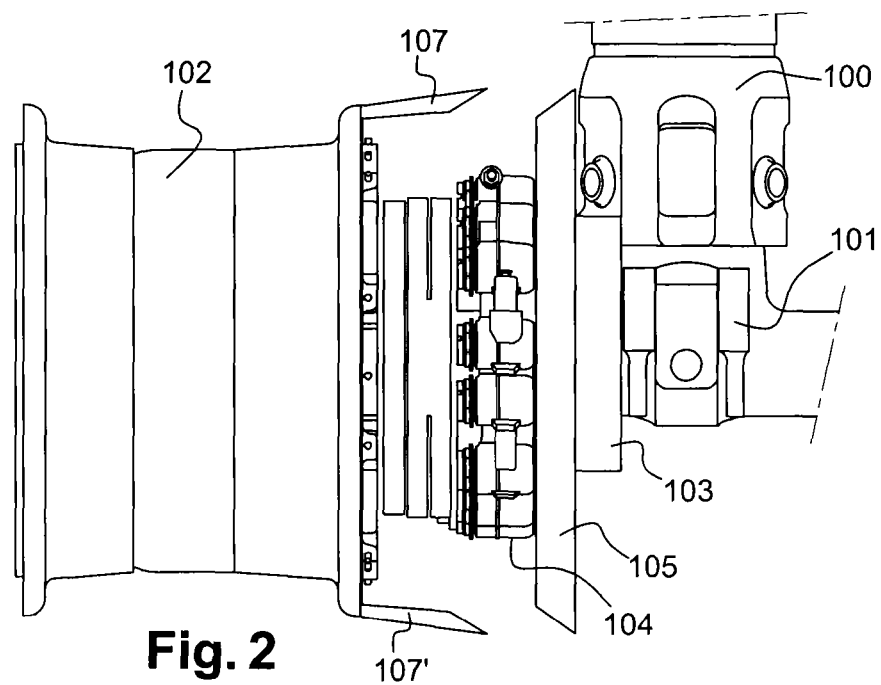
FIG. 2 presents a front view of an extract of a landing gear wheel rim with the interface device intact

This rotating part 105 contains a series of hollows arranged at its periphery (see FIG. 2) that are intended to accept the ends of the torque transfer bars 107 that are integral to the wheel rim 102. In this way, disassembly and reinstallation of the wheel 102 can be done very rapidly, without being hampered by the existence of the motorization and interface mechanisms.

The torque transfer bars 107 are sized to absorb the torque action that the wheels will be subject to.

Furthermore, to ensure protection of the entire interface device from foreign bodies, water, sand or dust, the rotating part 105 will house, in the present embodiment, the internal mechanisms that play part in transferring torque from the motor-reducer unit 103 to the wheel.

Only the hollows are arranged on the external surface of the rotating part 105.

The interface device has an input gear 301 (FIG. 3) located between the motor-reducer unit 103 and the revolving piece 105 that is driven directly by the motor-reducer unit 103 and that is joined to the rotating shaft 306, here parallel to the lateral Y axis.

A pendulum element 302, also joined to the rotating shaft 306 of the input gear 301, carries a first and a second intermediary gear wheels 303, 304 that are coplanar with the input gear and the cog wheel, arranged on each side of the input gear 301 and driven in rotation by the rotation of the input gear.

Note here that because of specific speed and torque requirements related to the forward and reverse movements, gear wheels 303 and 304 may have different diameters.

The second intermediate gear wheel 304 contains a rotation blocking device 305, which may be configured, for instance, in the form of claws that engage into the teeth of the gear wheel. Likewise, the first intermediate gear wheel 303 also comprises a rotation blocking device 310. These two blocking devices 305, 310 are carried by the pendulum element 302. They are synchronized, for example by means of a set of gears, such that the two intermediate gear wheels 303, 304 can be simultaneously engaged or simultaneously released. As a variant, a single blocking mechanism may be installed facing one of these intermediate gear wheels 303, 304 and this configuration may even prove preferable.

The angular displacement of the pendulum element 302 around its rotation axis 306 is limited within a range comprising a minimal and maximum value, by a first and a second adjustable stop 307, 308.

These adjustable stops 307, 308 are set so that when the pendulum element 302 comes into contact with an adjustable stop, the blocking mechanism of the intermediate gear wheels is released, whereas it is engaged when the pendulum element 302 is in the neutral position. (See comments on the gear meshing lines)

This group is opposite a cog wheel 309, integral to the rotating part 105 of the interface device, which drives a wheel 102 of the landing gear assembly through the torque transfer bars 107.

The distance between the pendulum element's rotation axis 306 and the rotation axis of the cog wheel 309 is determined by the radii of the intermediate gear wheels 303, 304 and the said cog wheel 309, and by the fact that these wheels mesh perfectly with each other when the pendulum element comes to block itself against one or the other of the adjustable stops 307, 308.

The drive gear of the electric motor and the software used for guiding aircraft ground operations are not part of this invents and are consequently not described here.

Operating Mode

The description of the way the interface device operates is done in reference to FIGS. 3 to 6. These drawings should be interpreted as illustrating the operating principles, and not as providing a faithful representation of the respective sizes of the various gear wheels involved in the process.

During operation, one of the key points of this invention is to leave the rotating part of the mechanism 105 free, i.e. not engaged with regard to the motor-reducer unit 103, for all phases of the flight except controlled phases, so as to avoid having to add a clutch, which would render the interface mechanically more complex, with resulting increased volume and weight and lowered reliability.

Figure 3:
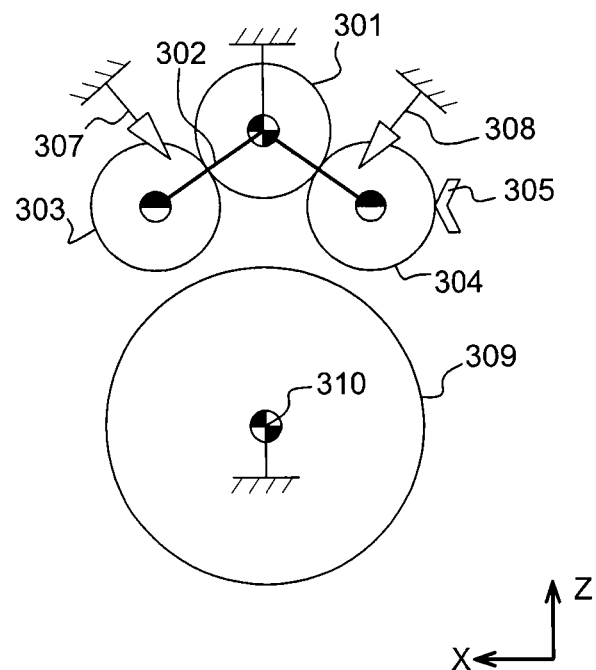
FIGS. 3-6 are schematic views of the relative positions of the various gear wheels of the interface device during the transition from a neutral position to a position of forward motion in one direction

In a first position, illustrated in FIG. 3, the motor-reducer unit 103 is stopped and the aircraft is not moving, which means that the cog wheel is also stationary. In this position, the pendulum element 302 is in a so-called neutral position, such that the two intermediate gear wheels 303, 304 are out of contact with the cog wheel 309. The forward motion blocking device 305 of the second intermediate gear 304 is engaged.

Figure 4:
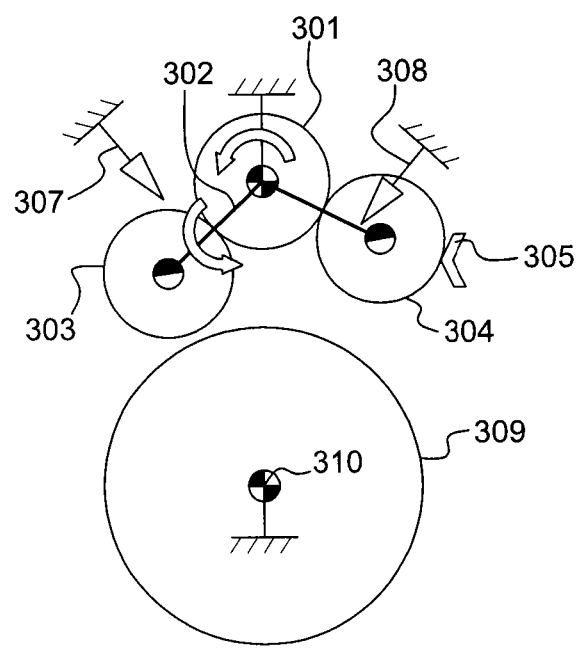

In a second position as shown in FIG. 4, the motor-reducer unit 103 is in operation, in this instance assumedly in the direction toward the front of the aircraft, and is beginning to rotate the input gear 301. As rotation blocking device 305 of one of the intermediate gear wheels 303 or 304 is engaged, the rotation movement of the input gear 301 causes the pendulum element 302 to turn around its axis 306 in the same direction as the input gear 301.

Figure 5:
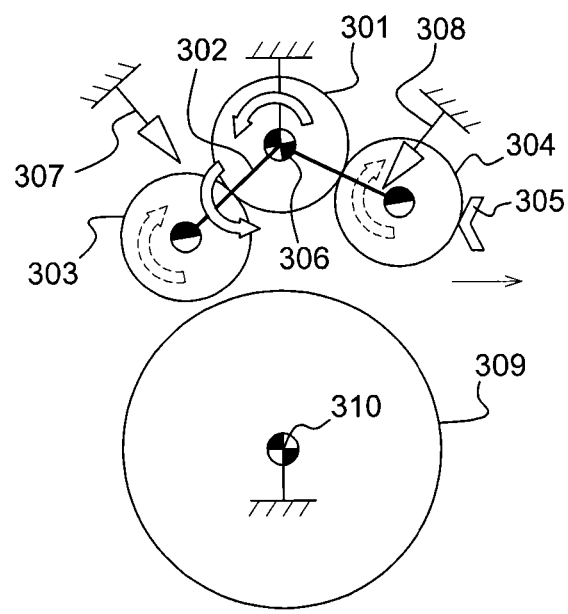

In a third position illustrated by FIG. 5, the first intermediate gear wheel 303 begins to attempt meshing with the cog wheel 309, but the pendulum element 302 is not yet blocked by the second stop 308. The rotation blocking device 305 of the intermediate gears is partially released and provides some rotational play to the first intermediate gear wheel 303 as illustrated in FIG. 5 by the arrow in dotted lines around the axis of the first intermediate gear wheel 303. This play is very important in the sense that it ensures that the teeth of said gear 303 mesh perfectly into the teeth of the cog wheel 309 and do not get caught on the tips of these teeth.

Figure 6:
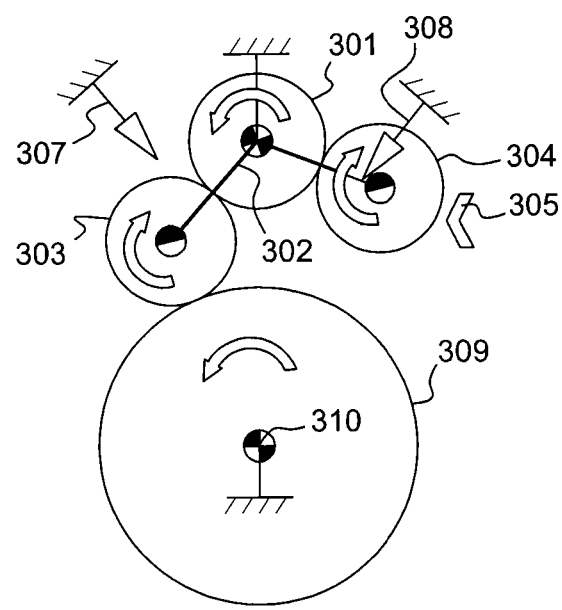

Finally, in a fourth position illustrate by FIG. 6, the first intermediate gear wheel 303, drives the cog wheel 309 and the pendulum element 302 is still blocked by the second stop 308, while the forward motion blocking device 305 of the second gear wheel 304 is fully released.

In this fourth position, the motor-reducer unit 103 drives the cog wheel 309 through the input gear 301 and the first intermediate gear wheel 303. The second intermediate gear wheel 304 turns freely around its axis, also driven by the input gear 301.

When the motor-reducer unit 103 stops these same steps are implemented reversely.

By construction, the gear wheels 303 and 304 remain intermeshed with the cog wheel when the motor stops. However, to return to the neutral position the motor-reducer unit must be driven in a movement opposite to that which caused one of the aforementioned gear wheels to intermesh with the cog wheel 309.

Due to the functional symmetry of the system it is understood that what has just been described applies identically with regard to activating the motor-reducer unit 103 in the other rotational direction, here assumed to correspond to a movement toward the rear of the aircraft, by replacing the first intermediate gear wheel 303 with the second intermediate gear wheel 304, and the stops and blocking devices of the second intermediate gear wheel 304 with those of the first intermediate gear wheel 303.

Note that on starting up, the landing gear wheel, and consequently the cog wheel 309, offer significant resistance to movement because of the inertia of the aircraft. Due to this, the first intermediate gear wheel 303 will, in continuing its rotation, spontaneously move into the position that enables it to fully mesh into the teeth openings of the cog wheel 309, thus guaranteeing optimum meshing and proper transmission of loads.

In addition, because of the relative position of the two gears, the first intermediate gear 303 and the cog wheel 309, the intermesh of these two gears is maintained as long as the motor-reducer unit 103 is operating. The force applied by the first intermediate gear 303 to drive the cog wheel 309, which is passive and which resists rotation because of natural friction arising when the aircraft is moving, increases torque exerted by the pendulum element 302 on the first intermediate gear wheel 303, which ensures maximum engagement.

In this situation, the relative speed of the two intermeshing gears 303 and 309 is directly proportional to the gear ratio.

Figure 7:
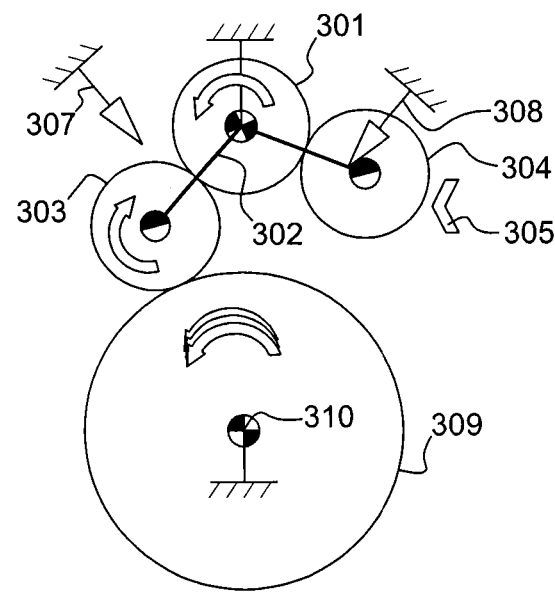
FIG. 7 shows the landing gear wheel in a situation of excessive speed, according to the same kind of drawings
Figure 8:
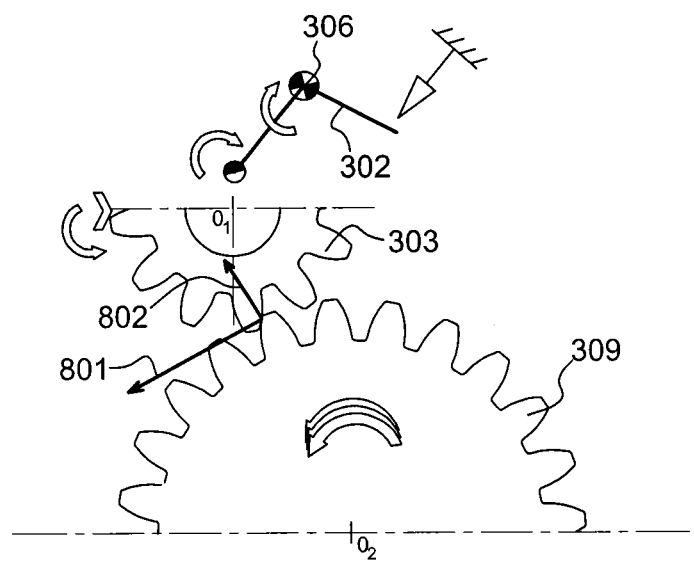
FIG. 8 illustrates the forces created in such a situation of excessive speed at the point of contact of the intermediate gear teeth with the cog, and the resultant torque applied on the pendulum element

FIG. 7, in contrast, shows a situation of excessive rotating speed of landing gear wheels with relation to the speed of the first intermediate gear wheel 303. Under these circumstances, as shown in greater detail in FIG. 8, because of the shape of the teeth of gear wheel 303 and of cog wheel 309, and because of the presence of the stop 308 that is only limiting pendulum movement only in the direction that lead the gear wheel 303 or 304 to be engaged in the cog wheel, the force exerted by cog wheel 309 onto the first intermediate gear wheel 303 comprises a tangential component 801 and a radial component 802 directed toward the exterior of the cog wheel 309. These components 801, 802 generate withdrawal torque of the pendulum element 302 from around its axis 306 that none of the stops is intended to prevent.

The first intermediate gear wheel 303 is free to move toward the top, in line with the curve determined by the rotation of the pendulum element 302, so it disengages itself naturally from the cog wheel 309.

This situation will create a ratcheting movement of the first intermediate gear wheel 303 from and toward the cog wheel 309, until the relative rotation speeds of the two elements 303, 309 are again compatible.

It is clear that this capacity for disengaging the wheels may be controlled voluntarily by slowing the motor-reducer unit 103.

Furthermore, it is possible to drive the motor-reducer unit 103 in the opposite direction. This causes the second intermediate gear wheel 304 to engage with the cog wheel 309 making it possible to use the motor-reducer unit 103 as an electromagnetic brake.

Figure 9:
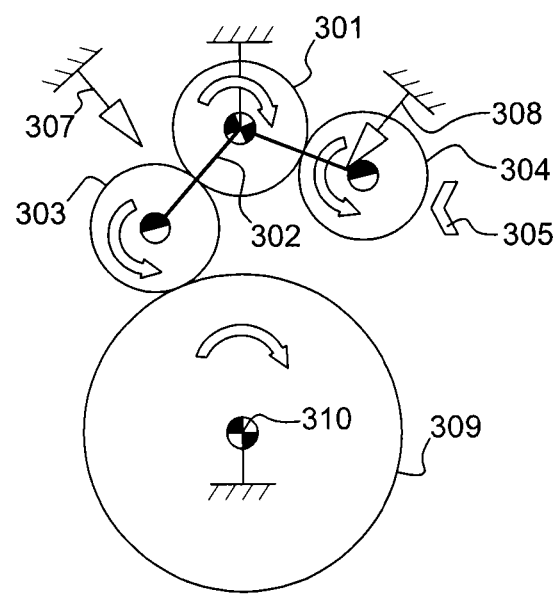
FIG. 9 illustrates, according to FIGS. 3 to 6, the situation of forced movement of the landing gear in the direction opposite to that of the motor-reducer engagement mode
Figure 10:
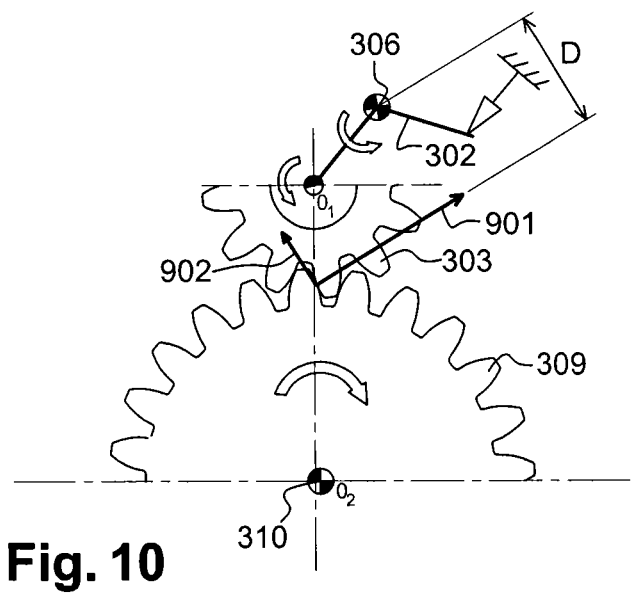
FIG. 10 illustrates the forces created, in that case, at the point of contact of the intermediate gear teeth with the cog wheel in a situation of excessive speed, and the resultant torque applied on the pendulum element.

FIGS. 9 and 10 illustrate a situation in which the aircraft moves in a direction opposite to the direction that the interface device engages; in FIG. 9, the interface mechanism is engaged similarly to that in FIGS. 3 to 6, described above as a movement in a forward direction, with the wheels moving in the opposite direction.

In this situation, due to the shape of the teeth of the gear wheel 303 and of the cog wheel 309 as well as the presence of the stop 308, the force exerted by the cog wheel 309 on the first intermediate gear wheel 303 comprises a tangential component 901 in the opposite direction of that of the previous case, and a radial component 902, directed, here again, toward the exterior of the cog wheel 309.

With the tangential component 901 clearly larger than the radial component 902, torque generated by these forces on the pendulum element 302 is an engagement torque that maintains the two wheels 303, 309 intermeshed. The motor-reducer unit 103 is then passively driven by the movement of the cog wheel 309.

Advantages

The motorization and interface mechanism as described meets the requirements of regulatory standards:

The mechanism is used for moving an aircraft forward and backward by furnishing mechanical power and torque to landing gear wheels. With reverse movement, the gear ratio may be set up differently with regard to the forward movement gear ratio;

The mechanism may be disengaged during all other phases of flight;

The mechanism is used to control each wheel independently in terms of speed and torque;

The mechanism is able to shift directly from the active mode to the idle mode;

The mechanism can provide delayed torque to wheels during forward and backward taxiing;

The mechanism and its installation have low impact on the design of landing gear structure.

Note that there is no change to the process of removing and remounting either brake or wheel components, and therefore no negative impact in terms of maintenance duration.

The system as described can:

Be disengaged and locked in a disengaged position if required

Automatically disengage in the event of excessive speed through a ratcheting mechanism move the motor rearward in the event of movement of the aircraft in the direction opposite to which the system is engaged Be intentionally disengaged while the aircraft is moving, then re-engaged in the opposite direction to assist in braking the aircraft

The invention claimed is:

1. A mechanism for motorizing a wheel of an aircraft's landing gear comprising a motor-reducer unit and an interface device installed between the motor-reducer unit and the wheel, wherein the interface device comprises:

an input gear fitted so as to be directly driven by the motor-reducer unit and joined to a rotating shaft along a lateral axis Y;

a cog wheel along an axis parallel to lateral axis Y capable of driving a wheel rim of said wheel rotationally, with the cog wheel and the input gear arranged on a same vertical plane XZ and a vertical axis Z outlined by center lines of the input gear and the cog wheel, and a longitudinal axis X laid out perpendicular to the vertical Z axis in a middle plane of the cog wheel and the input gear;

a pendulum element, joined to the rotating shaft and set in a neutral position, carrying at least one intermediate gear wheel arranged on the XZ plane alongside the input gear, driven in rotation around a parallel lateral axis Y by the rotation of the input gear wheel, wherein the at least one intermediate gear wheel contains a rotation blocking device, wherein an angular path of the pendulum element around its rotation axis is limited by an adjustable stop, said adjustable stop being set so that when the pendulum element comes into contact with the adjustable stop, the blocking mechanism is just released, whereas the blocking mechanism is engaged when the pendulum element is in the neutral position, the distance between the pendulum element's rotation axis and the rotation axis of the cog wheel is determined by the radius of the at least one intermediate gear wheel and said cog wheel, and by the cog wheel and the at least one intermediate gear wheel being fully engaged when the pendulum element comes to be blocked against the adjustable stop.

2. A mechanism according to claim 1, wherein the at least one intermediate gear wheel includes a first and a second intermediate gear wheel located on a vertical plane XZ, aranged on either side of the input gear onto the pendulum element and driven in rotation by the rotation of the input gear, with at least one of the first or second intermediate gear wheels comprising the rotation blocking device, wherein the angular displacement of the pendulum element around its rotational axis is limited to a range comprising a minimal and maximum value by a first and a second adjustable stop;

wherein said adjustable stops are adjusted so that:
 a) mesh lines of a gear with the cog wheel conform to theory,
 b) when the pendulum element comes into contact with a stop, the blocking device is released, whereas the blocking device is engaged when the pendulum element is in the neutral position, wherein said pendulum element faces the cog wheel, wherein the distance between the pendulum element's rotation axis and the rotation axis of the cog wheel is determined by the radius of the intermediate gear wheels and said cog wheel, and by the cog wheel and one or the other of the intermediate gear wheels being engaged when the pendulum element comes to be blocked against one or the other of the adjustable stops.

3. A mechanism according to claim 2, wherein each of the first and second intermediate gear wheels comprise the blocking device and the blocking device is carried by the pendulum element and synchronized in such a way that the first and second intermediate gear wheels are either simultaneously engaged or simultaneously released.

4. A mechanism according to claim 2, wherein when at least one of the first and second intermediate gear wheels begin to engage with the cog wheel, and the pendulum element is not yet engaged by an adjustable stop, the blocking device is partially released and determines rotational play with regard to the first intermediate gear wheel.

5. An aircraft landing gear assembly, comprising a motorization mechanism according to claim 1.

6. An aircraft, comprising a motorization mechanism according to claim 1.

* * * * *